United States Patent [19]
Taig

[11] Patent Number: 5,161,648
[45] Date of Patent: Nov. 10, 1992

[54] DISC BRAKE WITH VARIABLE WIDTH CALIPER

[75] Inventor: Alistair G. Taig, Edwardsburg, Mich.

[73] Assignee: Allied-Signal Inc., Morristown, N.J.

[21] Appl. No.: 789,213

[22] Filed: Nov. 7, 1991

[51] Int. Cl.⁵ ............................................. F16D 55/227
[52] U.S. Cl. ................................. 188/71.1; 188/71.9; 188/196 D
[58] Field of Search ................ 188/71.1, 71.7, 71.8, 188/71.9, 72.3, 72.6, 72.7, 72.8, 369, 370, 196 D, 196 V, 106 R, 106 F, 106 P

[56] References Cited

U.S. PATENT DOCUMENTS

| | | | |
|---|---|---|---|
| 3,323,618 | 6/1967 | Riddy | 188/79.5 |
| 3,517,783 | 6/1970 | Belavt | 188/71.9 |
| 3,835,960 | 9/1974 | Moss | 188/71.9 |
| 3,851,737 | 12/1974 | Hewins | 188/71.9 |
| 4,014,411 | 3/1977 | Troester | 188/71.9 |
| 4,030,576 | 6/1977 | Pringle | 188/71.8 |
| 4,031,985 | 6/1977 | Ito | 188/71.9 |
| 4,355,708 | 10/1982 | Papagni | 188/196 D |
| 4,487,295 | 12/1984 | Mitchell | 188/72.6 |
| 4,540,066 | 9/1985 | Evans | 188/71.9 |
| 4,776,439 | 10/1988 | Tickle et al. | 188/71.8 |
| 4,838,078 | 5/1989 | Matsumoto | 188/196 |
| 5,000,294 | 3/1991 | Hunnicutt et al. | 188/71.9 |
| 5,086,885 | 2/1992 | Bowsher | 188/71.9 |

FOREIGN PATENT DOCUMENTS

| 1531556 | 7/1968 | France . | |
|---|---|---|---|
| 1001267 | 8/1965 | United Kingdom | 188/71.9 |

Primary Examiner—Robert J. Oberleitner
Assistant Examiner—Chris Schwartz
Attorney, Agent, or Firm—Larry J. Palguta; Ken C. Decker

[57] ABSTRACT

The disc brake (100) with variable width caliper comprises first and second bridge members (14, 15) which are connected with a pair of movable members (20, 30) extending over the periphery of the rotor (51). Each of the movable members (20, 30) is mounted upon an anchor extension (37A, 38A). An inboard end of each movable member (20, 30) includes threads (26, 36) upon which is threadably mounted a nut (28, 29). The nut (28, 29) has rachet teeth (12, 13) on one axial end which engage rachet teeth (10A, 11A) of an associated actuator sleeve (10, 11) disposed slidably about the movable member (20, 30). The second bridge member (15) is mounted slidably upon the movable members (20, 30). The actuator sleeves (10, 11) may be rotated by an actuator mechanism (70) which, through the engaged rachet teeth (10A, 11A; 12, 13), causes the nuts (28, 29) to rotate and effect translational movement of the movable members (20, 30). The actuator sleeves (10, 11) engage roller thrust bearings (44, 45) which, as the nuts (28, 29) change their positions along the movable members (20, 30), displace the second bridge member (15) and a friction lining mechanism (16) against the rotor (51), and by reaction, the movable members (20, 30) bring a friction lining mechanism (17) of the first bridge member (14) into engagement with the other face of the rotor (51). The second bridge member (15) may include one or more bores (50) each receiving therein a piston (52) and actuatable by hydraulic fluid.

20 Claims, 3 Drawing Sheets

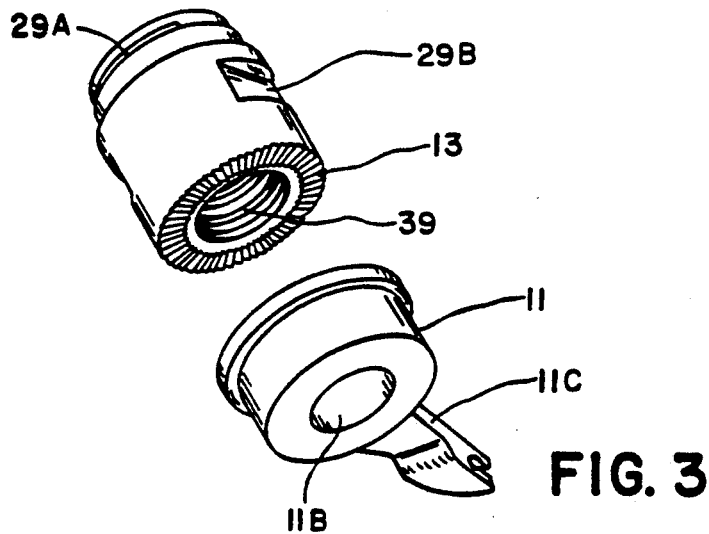
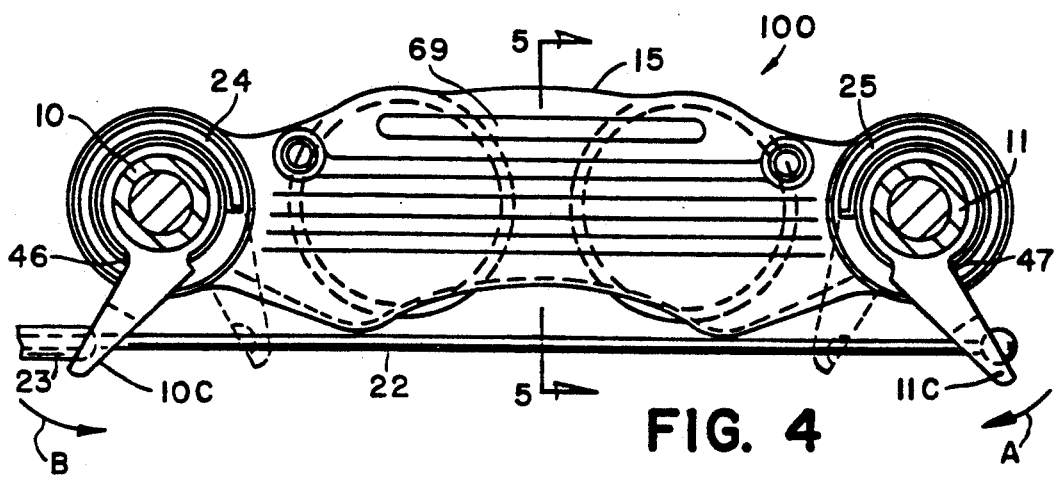
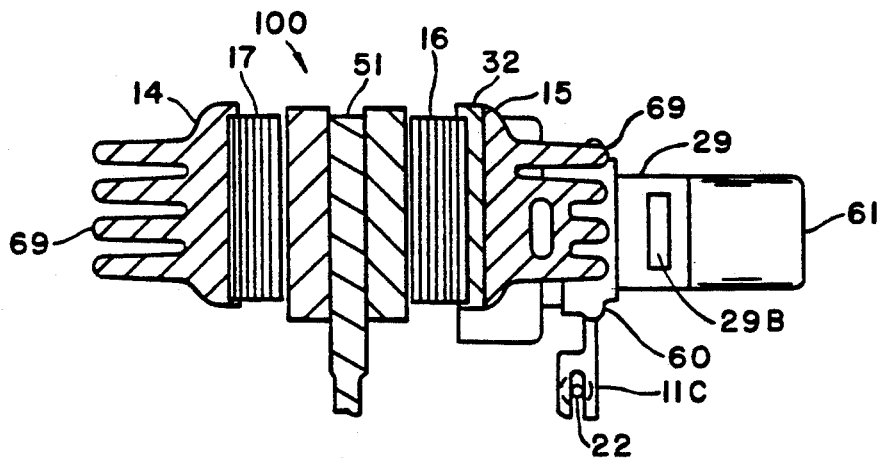

DISC BRAKE WITH VARIABLE WIDTH CALIPER

The present invention relates generally to a disc brake, and in particular to a disc brake with a variable width caliper.

Many types of disc brakes have been proposed over the years. A disc brake with a variable width type of caliper has been proposed previously in French Patent No. 1,531,556 published Jul. 5, 1968. However, current production brake calipers typically utilize a rigid caliper structure which spans the rotor disc in order to carry inner and outer brake pads and react the clamping loads. The majority of service brake calipers contain one or more pistons which can be displaced, hydraulically, to apply the clamping forces to the shoes. As the friction pads wear, the pistons must extend from their cylinder bores and the hydraulic system must have a sufficient capacity to make up the changes in required fluid volume. It is highly desirable to provide a disc brake which can provide the service braking function by mechanical actuation and thus not require any hydraulic fluid for actuation. It is desirable that such a disc brake contain as few parts as possible, be highly reliable, and effect large clamping loads for braking. It is also advantageous if such a disc brake could contain hydraulically actuated pistons for service braking, while retaining the mechanical actuation function for parking brake applications and also provide automatic wear adjustment so that changes in fluid volume requirements are minimal. It is highly advantageous if such a disc brake comprises easily assembled members having high stiffness and low weight, resulting in the service pistons needing to travel only a distance sufficient to take up the running clearance of the brake and pad deflections. If the brake contains high stiffness and low weight components, the inherently stiff caliper assembly reduces the hydraulic fluid requirement of the brake system and also reduces the size and power requirements of a brake booster utilized for service braking.

The above problems are solved by the present invention which comprises a disc brake with a variable width caliper, comprising a pair of spaced apart movable members extending across a rotor of a vehicle, each movable member connected with a first bridge member and a second bridge member, each of the bridge members including friction lining means, each movable member having at one end thereof thread means receiving threadedly thereon nut means, one axial end of each nut means including teeth means, an actuator sleeve about each movable member and having at one axial surface teeth means which engage the teeth means of a respective nut means, and the second bridge member received slidably on the movable members, so that rotation of the actuator sleeves causes said nut means to rotate and effect translational movement of the movable members whereby the bridge members bring the respective friction lining means into engagement with said rotor.

One way of carrying out the invention is described in detail below with reference to the drawings which illustrate an embodiment in which:

FIG. 3 is an exploded view of an actuator sleeve and associated nut;

FIG. 4 is a view taken along view line 4—4 of FIG. 1;

FIG. 5 is a section view taken along view line 5—5 of FIG. 2; and

Figure 1:
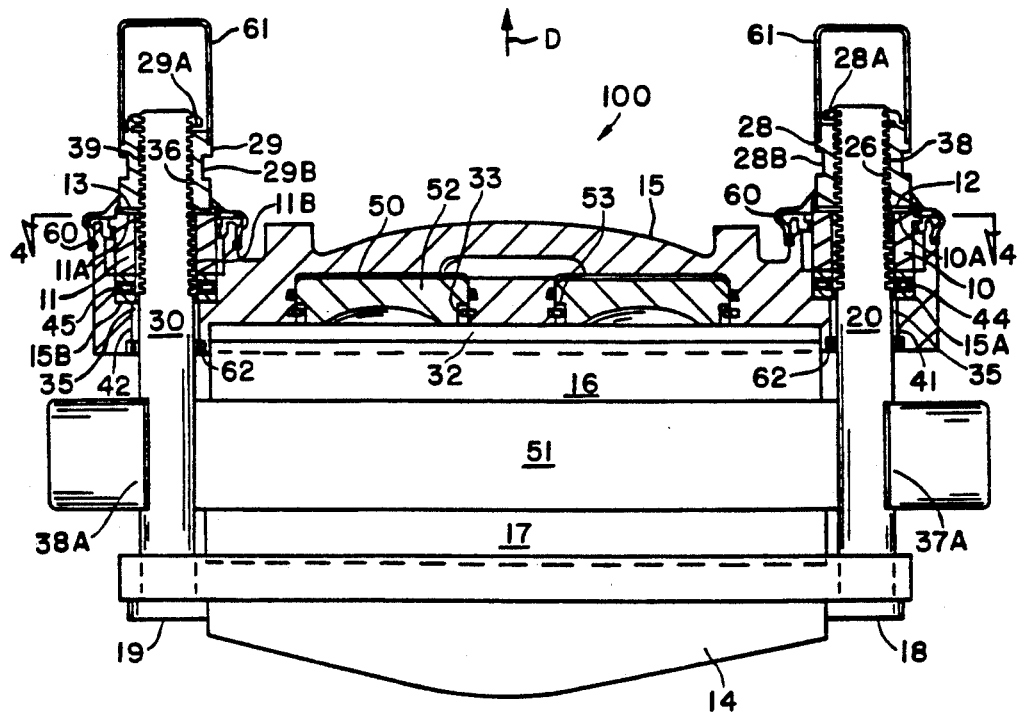
FIG. 1 is a top partial section view of the disc brake of the present invention.
Figure 2:
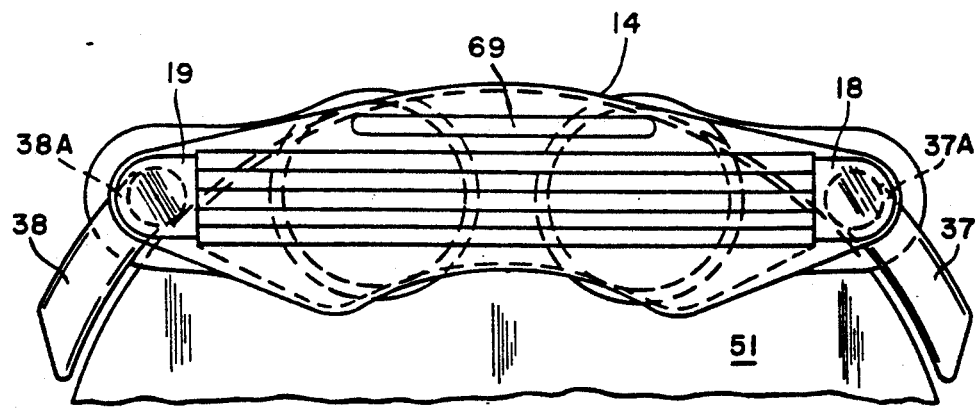
FIG. 2 is a side view of the disc brake of the present invention.

Referring to FIG. 1, the disc brake of the present invention is designated generally by reference numeral 100. Disc brake 100 comprises first or outboard bridge member 14 and second or inboard bridge member 15, each connected with a pair of pins or movable members 20 and 30. Second bridge member 15 includes a pair of spaced apart axial openings 41 and 42 receiving therein bushings 35 located about nonrotatable and axially movable members 20, 30. Second bridge member 15 includes friction lining means 16 having backing plate 32, while first bridge member 14 includes friction lining means 17 which is carried by member 14 and does not have a backing plate. Located between the friction material linings 16 and 17 is rotor 51. An anchor plate includes anchor plate extensions 37, 38 (see FIG. 2) having curved ends 37A, 38A which capture and slidingly receive the respective movable members. Bridge members 14 and 15 have fins 69 (see FIG. 5) for heat dissipation. Movable members 20, 30 include respective threads 26 and 36 which comprise buttress threads or any other suitable high efficiency form of threads. A pair of nuts 28 and 29 include internal threads 38 and 39 which engage the respective threads 26, 36. Each nut includes transverse opening 28A or 29A (see FIG. 3) which allows the respective nut to be deformed slightly during manufacture, so that axial deformation of the nut creates a friction or rotational drag between the internal threads of the nuts and the threads of the movable members. The rotational drag is important during the release phase of braking, as will be explained below. Nuts 28, 29 each contain slots 28B, 29B for manual rotation and respective rachet teeth 12, 13 on one axial end thereof which engage correspondingly shaped rachet teeth 10A and 11A on axial faces of the respective actuator sleeves 10 and 11. The actuator sleeves include internal through openings 10B, 11B which permit the actuator sleeves to be mounted axially slidable about the threads of the movable members. Second bridge member 15 includes a pair of axial recesses 15A, 15B which receive therein roller thrust bearings 44, 45 and the respective actuator sleeves 10, 11. Boot seals 60 extend from second bridge member 15 over the openings of the respective recess 15A, 15B and engage the actuator sleeves and nuts adjacent each of the interfaces of the rachet teeth in order to prevent contaminants from entering between the rachet teeth and into the respective recesses. Caps 61 are attached to the nuts 28, 29 to keep contaminants out of the thread interfaces with the movable members 20, 30. Second bridge member 15 also includes a pair of seals 62 at the ends of the axial openings 41, 42 in order to prevent contaminants from entering the interface between bushings 35, 36 and movable members 20, 30.

Referring to FIGS. 3 and 4, actuator sleeves 10 and 11 each include respective lever members 10C, 11C for engagement with an actuating mechanism comprising cable 22 and movable conduit 23. Actuator sleeves 10, 11 are engaged by respective return spring 24, 25, which bias the associated lever member toward an at rest position defined by lever stop 46, 47.

During a service or parking brake application, cable 22 is displaced such that lever 11C is rotated in the direction of Arrow A in FIG. 4, and by reaction, movable conduit 23 displaces lever member 10C in the direction of Arrow B in FIG. 4. The rotation of the lever members causes a corresponding rotation of the integrally connected actuator sleeves 10, 11 whereby rachet teeth 10A and 11A engage rachet teeth 12, 13 of nuts 28, 29 and cause rotation thereof. Rotation of nuts 28, 29 causes translational movement of movable members 20, 30 in the direction of Arrow D in FIG. 1 such that friction lining means 16 of second bridge member 15 is displaced via the roller thrust bearings into engagement with the corresponding surface of rotor 51. By reaction, heads 18 and 19 of movable members 20 and 30 cause first bridge member 14 to bring friction lining means 17 into engagement with the other face of rotor 51. When the braking application is completed, a release of cable 22 will effect an automatic release of the braking application. Threads 38 and 39 have a high helix angle and would normally be multi-start threads so that upon braking release nuts 28 and 29 will return to a lightly loaded condition. Return springs 24, 25 will then continue to rotate actuator sleeves 10, 11 (via levers 10C, 11C) back to lever stops 46, 47. If excessive clearance exists between the friction lining means and the rotor, the rachet teeth of the respective nuts and actuator sleeves will tend to separate due to the angled back face of the teeth as illustrated in FIG. 3. When this occurs, the nuts will stop turning when the tips of the rachet teeth disengage. After the lever members reach the respective lever stops and racheting ceases, the clearance between the friction lining means and rotor will be equal to height of the rachet teeth. In order to assist the operation of the adjustment mechanism, the rotational drag created for the nuts by the axial deformation of the nuts via transverse openings 28A, 29A, provides a frictional engagement between the threads of the nuts and the threads of the movable members so that as the rachet teeth began to disengage, the nuts will stop rotating and permit the respective rachet teeth to disengage.

If it is desired that the disc brake with variable width caliper of the present invention include a hydraulic actuation mechanism, second bridge member 15 may include one or more piston bores 50 each having therein a piston 52 which, through a piston shoulder 53, may engage a retaining ring or abutment 33 that limits outward movement of the piston. Bores 50 receive, as is well-known in the art, hydraulic fluid from a pressure producing device such as a master cylinder or brake booster, which will cause each piston 52 to move outwardly against backing plate 32 and move friction lining means 16 into engagement with the associated face of rotor 51. By reaction, movable members 20, 30 bring friction lining means 17 of first bridge member 14 into engagement with the opposite surface of rotor 51.

One important feature of the disc brake of the present invention is that when one or more pistons 52 are utilized for service brake application and the nuts, actuator sleeves, lever members, conduit and cable are utilized for parking brake applications, the parking brake load exceeds the load effected by service braking. As a result, when the service and parking brake functions are effected simultaneously, load compounding cannot occur because the service brake load is carried through the parking actuator movable member and nut mechanisms. In other words, the disc brake has a maximum braking or clamping load which is defined by the parking load, and because this cannot be exceeded by the clamping force effected by the service brake pistons, load compounding does not occur.

Figure 6:
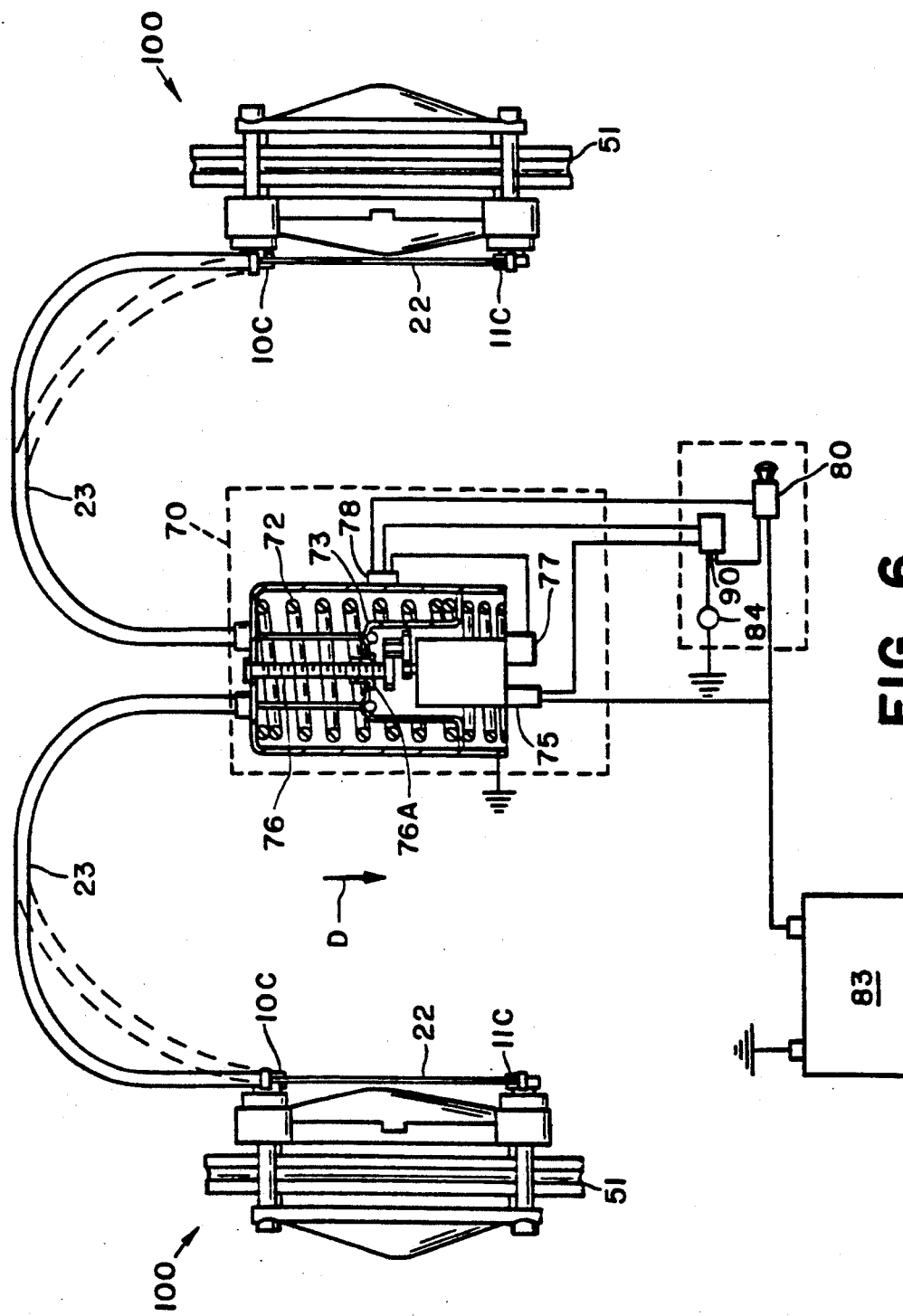
FIG. 6 is an illustration of a parking brake system utilizing disc brakes in accordance with the present invention.

Referring to FIG. 6, a parking brake system utilizing disc brakes 100 disclosed herein is illustrated. Disc brakes 100 each have lever members 10C, 11C which are connected with cables 22 and movable conduits 23. Spring actuator mechanism 70 includes actuating spring 72 engaging spring flange member 73, with cables 22 attached to flange member 73. Motor relay 75 can effect rotation of gears which rotate screw member 76 for retraction of flange member 73 and spring 72 via nut 76A. Lock solenoid 77 is utilized to lock in a retracted position flange member 73 and connected cables 22. Manually operated parking switch 80 can effect operation of motor relay 75 via battery 83, and illumination of parking lamp 84. Ignition switch 90 is connected with the parking switch and motor relay. Magnetic sensing switch 78 senses travel of flange member 73 so that during release of the parking brake the motor relay will cease operation at the appropriate time. When the vehicle operator wishes to effect a parking brake application, the operator actuates parking switch 80, which via switch 78 effects an operation of the lock solenoid 77 such that, via unlocked gears connected with the screw member 76, the screw member 76 is released rotatably and permits spring biased flange member 73 to translate in the direction of Arrow D. As flange member 73 and cables 22 move in the direction of Arrow D, the movable conduits 23 must, by reaction, change shape toward the illustrated dotted line positions such that they effect displacement of the lever members 10C. Thus, lever members 10C, 11C are each rotated as illustrated in FIG. 4, and disc brakes 100 effect clamping loads upon the respective rotors 51. When the vehicle operator wishes to release the parking brake mechanism, parking switch 80 is actuated which effects an energization of motor 75 which causes rotation of screw 76 that retracts spring 72 via translating nut 76A and flange member 73, and when flange member 73 reaches an appropriate position adjacent magnetic sensing switch 78 which causes the motor to be de-energized and lock solenoid 77 actuated so that the spring actuator mechanism 70 is mechanically locked in position until the next parking brake application.

In an alternative system in which power assisted parking is not required, the cables 22 may be actuated by means of a hand parking lever or foot pedal.

What is claimed is:

1. A disc brake with a variable width caliper, comprising a pair of spaced apart movable members extending across a rotor of a vehicle, each movable member connected with a first bridge member and a second bridge member, each of the bridge members including friction lining means, each movable member having at one end thereof thread means receiving threadedly thereon nut means, one axial end of each nut means including teeth means, an actuator sleeve about each movable member and having at one axial surface teeth means which engage the teeth means of a respective nut means, and the second bridge member received slidably on the movable members, so that rotation of the actuator sleeves causes said nut means to rotate and effect translational movement of the movable members whereby the bridge members bring the respective friction lining means into engagement with said rotor.

2. The disc brake in accordance with claim 1, wherein each of the actuator sleeves including a lever member extending therefrom and connected to means for actuation.

3. The disc brake in accordance with claim 2, wherein said actuation means comprises a cable disposed within a movable conduit, the cable attached to one of said lever members and the conduit engaging the other of said lever members.

4. A vehicle parking system which includes the disc brake in accordance with claim 3, the system including a spring actuator wherein release of a spring of the actuator to effect a parking brake application causes displacement of the cable and, by reaction, displacement of the movable conduit.

5. The system and disc brake in accordance with claim 4, further comprising motor means for returning said spring actuator to an inactivated mode, and solenoid means for retaining said spring in a retracted position in the inactivated mode.

6. The disc brake in accordance with claim 2, further comprising a pair of lever stops so that each of said levers engages a lever stop to define an at rest position.

7. The disc brake in accordance with claim 6, wherein each lever is engaged by a return spring which biases the lever toward the respective lever stop.

8. The disc brake in accordance with claim 1, wherein each nut means includes therein transverse opening means such that an associated axial portion of the nut means may be altered and threads of the nut means engage the thread means of the respective movable member with a predetermined frictional engagement which resists rotation of the respective nut means.

9. The disc brake in accordance with claim 8, wherein each nut means includes a protective cap connected therewith in order to keep contaminants away from threads thereof.

10. The disc brake in accordance with claim 1, wherein the second bridge member includes at least one bore with a piston disposed therein, the bore containing hydraulic fluid which, when pressurized, causes said piston to move outwardly and into engagement with the respective friction lining means.

11. The disc brake in accordance with claim 10, wherein the bore includes thereabout a retaining ring which limits the outward movement of said piston.

12. The disc brake in accordance with claim 1, wherein each actuator sleeve engages thrust bearing means disposed between the actuator sleeve and the second bridge member.

13. The disc brake in accordance with claim 1, wherein the second bridge member includes a pair of spaced-apart openings through which extend the movable members, and bushing means disposed in each spaced-apart opening and about the respective movable member.

14. The disc brake in accordance with claim 1, wherein the first bridge member includes a pair of spaced apart openings receiving therein the movable members, each movable member having an enlarged diameter head which engages the first bridge member adjacent the respective opening.

15. A disc brake with a variable width caliper, comprising a pair of spaced apart movable members extending across a rotor of a vehicle, each movable member connected with a first bridge member and a second bridge member, each of the bridge members including friction lining means, each movable member having at one end thereof thread means receiving threadedly thereon nut means, each nut means including teeth means, an actuator sleeve about each movable member and having teeth means which engage the teeth means of a respective nut means, and the second bridge member received slidably on the movable members, so that rotation of the actuator sleeves causes said nut means to rotate and effect translational movement of the movable members whereby the bridge members bring the respective friction lining means into engagement with said rotor.

16. A vehicle parking system which includes the disc brake in accordance with claim 15, the system including a spring actuator wherein release of a spring of the actuator to effect a parking brake application causes displacement of a cable and, by reaction, displacement of a movable conduit, the cable and conduit being connected to respective actuator sleeves.

17. The system and disc brake in accordance with claim 16, further comprising motor means for returning said spring actuator to an inactivated mode, and solenoid means for retaining said spring in a retracted position in the inactivated mode.

18. The disc brake in accordance with claim 15, wherein each nut means includes therein opening means such that an associated axial portion of the nut means may be altered and threads of the nut means engage the thread means of the respective movable member with a predetermined frictional engagement which resists rotation of the respective nut means.

19. The disc brake in accordance with claim 15, wherein one bridge member includes at least one bore with a piston disposed therein, the bore containing hydraulic fluid which, when pressurized, causes said piston to move into engagement with the respective friction lining means.

20. The disc brake in accordance with claim 19, wherein the bore includes an abutment which limits outward movement of said piston.

* * * * *